US008664325B2

(12) United States Patent
Kobayashi et al.

(10) Patent No.: US 8,664,325 B2
(45) Date of Patent: Mar. 4, 2014

(54) POLY(TRIMETHYLENE TEREPHTHALATE) MOLDING RESINS AND MOLDED ARTICLES THEREFROM

(75) Inventors: Toshikazu Kobayashi, Chadds Ford, PA (US); Kazuyuki Nakata, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 336 days.

(21) Appl. No.: 12/715,618

(22) Filed: Mar. 2, 2010

(65) Prior Publication Data
US 2010/0227959 A1    Sep. 9, 2010

Related U.S. Application Data

(60) Provisional application No. 61/156,939, filed on Mar. 3, 2009.

(51) Int. Cl.
*C08F 283/02*    (2006.01)

(52) U.S. Cl.
USPC ...................................................... 524/513

(58) Field of Classification Search
USPC ........................................................ 524/513
See application file for complete search history.

(56) References Cited

U.S. PATENT DOCUMENTS

| | | | |
|---|---|---|---|
| 3,404,134 | A | 10/1968 | Rees |
| 6,277,947 | B1 | 8/2001 | Kelsey |
| 6,518,365 | B1 | 2/2003 | Powell |
| 7,332,561 | B2 | 2/2008 | Kato |
| 8,242,209 | B2 | 8/2012 | Talkowski |
| 2006/0020103 | A1 | 1/2006 | Tsukamoto et al. |
| 2008/0131715 | A1* | 6/2008 | Dewa et al. ............ 428/483 |
| 2010/0309571 | A1* | 12/2010 | Watari et al. ........... 359/883 |

FOREIGN PATENT DOCUMENTS

| | | |
|---|---|---|
| JP | 2004-189977 | 7/2004 |
| JP | 2007-177135 | 12/2007 |
| WO | 2009/094359 | 7/2009 |

OTHER PUBLICATIONS

Patent Abstracts of Japan, Publication No. 2008-280503, Nov. 20, 2008, Toray Ind. Inc.
Patent Abstracts of Japan, Publication No. 2001-011292, Jan. 15, 2001, Kanegafuchi Chem., Ind. Co. Ltd.
International Search Report in Corresponding International Application PCT/US2010/025856, Jul. 2, 2010.

* cited by examiner

*Primary Examiner* — Yong Chu
*Assistant Examiner* — Sonya Wright
(74) *Attorney, Agent, or Firm* — Loretta Smith; Otha Weaver; Paul Shannon

(57) ABSTRACT

Disclosed is a thermoplastic composition including a molding resin including (a-1) a poly(trimethylene terephthalate) resin, (a-2) 0 to 20 weight % of one or more organic additives; and (a-3) 0.1 to 4 weight % of one or more ionomer polymers or a combination of one or more ionomer polymers and acid copolymers; said ionomer polymers and acid copolymers having $C_3$ to $C_8$ carboxylic acid repeat units, and each ionomer and acid copolymer having: a weight %, W; a weight fraction of $C_3$ to $C_8$ carboxylic acid repeat units, Z, based on the weight of each ionomer or acid copolymer; and a neutralization ratio, N, equal to any value from 0 to 1.0; wherein said neutralization ratio N is the mol fraction of the carboxylic acid repeat units neutralized as an alkali metal salt, based on the total carboxylic acid repeat units in said ionomer and acid copolymers; and said each ionomer and acid polymer wt % W is based on the weight of components (a-1), (a-2) and (a-3); and said molding resin has an alkali carboxylate factor, ACF, of 4 to about 14; wherein said ACF is defined by the formula (I):

$$ACF = \Sigma_{a\text{-}i}[(W \cdot Z \cdot N)_{a\text{-}i}(W \cdot N)_{a\text{-}i} \cdot 100/\Sigma_{a\text{-}i}(W)_{a\text{-}i}] \qquad (I).$$

14 Claims, 3 Drawing Sheets

POLY(TRIMETHYLENE TEREPHTHALATE) MOLDING RESINS AND MOLDED ARTICLES THEREFROM

CROSS REFERENCE TO RELATED APPLICATIONS

This application claims the benefit of U.S. Provisional Application No. 61/156,939, filed Mar. 3, 2009, which is incorporated herein by reference in its entirety.

FIELD OF INVENTION

This invention is directed to poly(trimethylene terephthalate) molding resins and molded articles therefrom.

BACKGROUND OF INVENTION

Thermoplastic polymers are commonly used to manufacture various shaped articles that may be use in applications such as automotive parts, food containers, electrical parts, etc. Shaped articles comprising polyester may be prepared from the molten polymer by a number of melt extrusion processes such as injection molding, compression molding, and blow molding.

Poly(trimethylene) terephthalate (PTT), produced from renewable source of 1,3-propanediol and developed by E. I. du Pont de Nemours & Company (DuPont), is commercially available under Sorona® resin. DuPont pioneered a way to produce the 1,3-propanediol from renewable resources including corn sugar. Sorona® resin has properties including semi-crystalline molecular structure.

It is desirable to develop a thermoplastic polyester composition such as PTT that can be crystallized rapidly from the melt, in order to improve the injection molding processing, and at the same time, improve the hydrolytic stability of the thermoplastic composition.

Furthermore, PTT has a higher equilibrium cyclic oligomer concentration, typically about 2.5% by weight based on the resin weight, when compared to similar polyesters such as PET or PBT, that typically have 1.4-1.8% by weight of cyclic oligomer. The most abundant cyclic oligomer of PTT is the cyclic dimer. When PTT resin molded parts are subjected to higher than normal temperature conditions (80° C. to 160° C.) the cyclic dimer of PTT is observed to bloom to the surface of the molded part, resulting in an undesirable cosmetic defect. The surface of a black part (containing carbon black) whitens with a crystalline powder of cyclic dimer. A related problem for polymer compositions, in particular polyester compositions and polymer compositions having a polyester component, is the release of low molecular weight components when heated, referred to as "outgassing". This can be a particular problem in polymer parts that are often or even constantly subjected to high temperatures, such as a bezel, a housing for a lamp or a reflector for a lamp, all of which are heated by the lamp.

U.S. Pat. No. 6,441,129, Duh, et al, discloses a process for producing PTT at an increased solid state polymerization rate. The concentration of cyclic oligomer in the PTT provided by the process is not disclosed. Duh also discloses specific solid state polymerization processes in J. Appl. Polymer Sci., Vol 89, 3188-3200 (2003).

U.S. Pat. No. 7,332,561 discloses a PTT composition in the form of fine particles having a cyclic dimer content of 1.5% by weight or less, and a process fro making the composition.

SUMMARY OF INVENTION

One aspect of the invention is a thermoplastic composition comprising
a) a molding resin comprising
  (a-1) a poly(trimethylene terephthalate) homopolymer or copolymer;
  (a-2) optionally, 0.1 to 20 weight % of one or more organic additives selected from the group consisting of lubricants, flow modifiers, plasticizers, heat stabilizers, antioxidants, dyes, pigments, and UV stabilizers;
  (a-3) 0.1 to 4 weight % of one or more ionomer polymers or a combination of one or more ionomer polymers and acid copolymers; said ionomer polymers and acid copolymers having $C_3$ to $C_8$ carboxylic acid repeat units, and each ionomer and acid copolymer having:
  a weight %, W;
  a weight fraction of $C_3$ to $C_8$ carboxylic acid repeat units, Z, based on the weight of each ionomer or acid copolymer; and
  a neutralization ratio, N, equal to any value from 0 to 1.0; wherein said neutralization ratio N is the mol fraction of said carboxylic acid repeat units neutralized as an alkali metal salt, based on the total carboxylic acid repeat units in said ionomer and acid copolymers; and said each ionomer and acid polymer wt % W is based on the weight of components (a-1), (a-2) and (a-3);
  and said molding resin has an alkali carboxylate factor, ACF, of 4 to about 14; wherein said ACF is defined by the formula:

$$ACF = \Sigma_{a\text{-}i}[(W \cdot Z \cdot N)_{a\text{-}i}(W \cdot N)_{a\text{-}i} \cdot 100/\Sigma_{a\text{-}i}(W)_{a\text{-}i}]$$

and,
b) 0 to 50 wt % of one or more fillers, based on the total weight of the thermoplastic composition.

Another aspect of the invention is a molded article comprising the thermoplastic composition as disclosed above.

DETAILED DESCRIPTION

Figure 1:
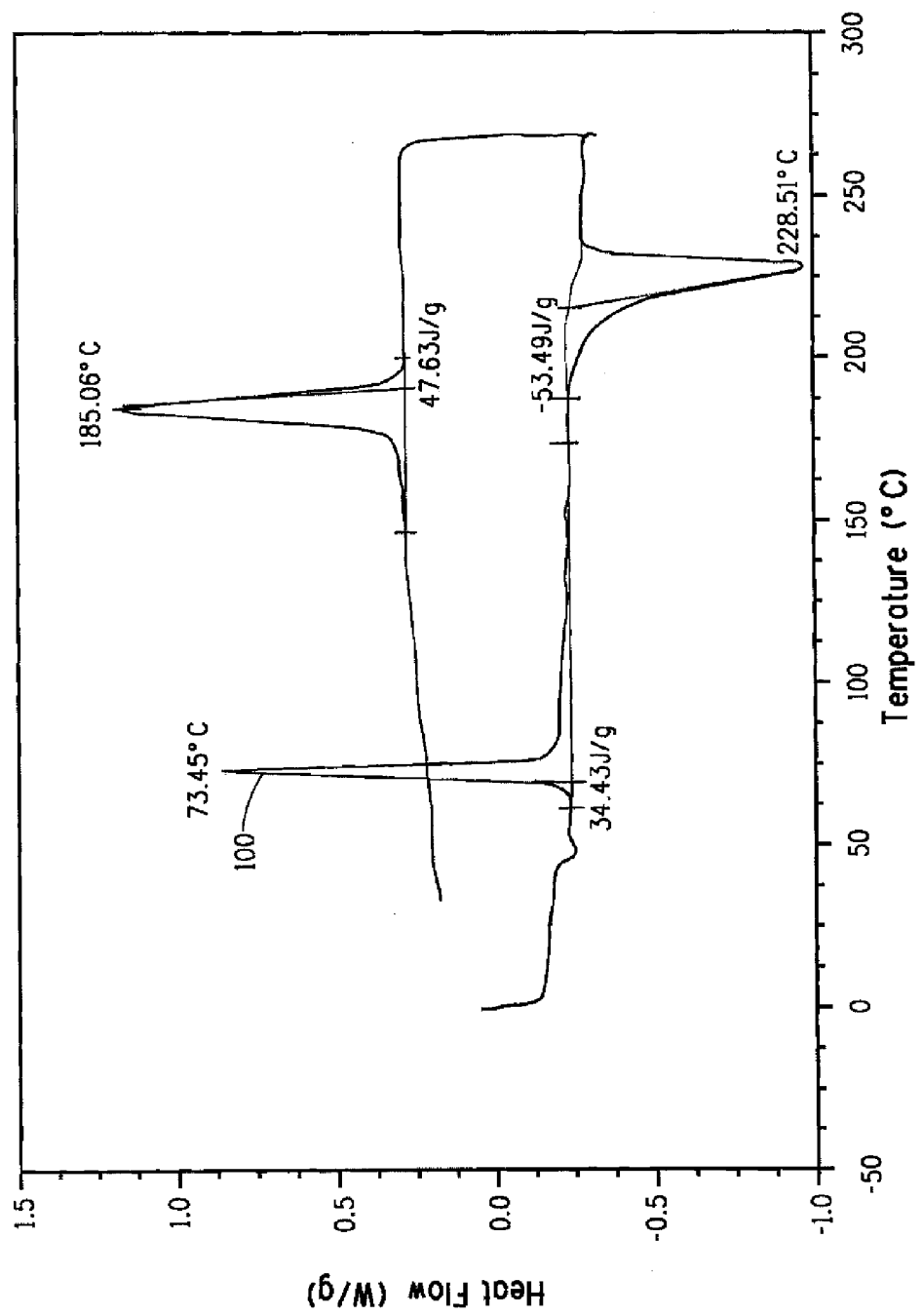
FIG. 1 shows a DSC scan of a melt quenched sample of a commercial PTT resin without added ionomer or acid polymer compositions.

Herein "copolymer" refers to polymers comprising copolymerized units resulting from copolymerization of two or more comonomers. "Dipolymer" refers to polymers consisting essentially of two comonomer-derived units and "terpolymer" means a copolymer consisting essentially of three comonomer-derived units.

A "poly(trimethylene terephthalate) homopolymer" means any polymer consisting essentially of repeat units of trimethylene terephthalate. A poly(trimethylene terephthalate) homopolymer is substantially derived from the polymerization of 1,3-propanediol with terephthalic acid, or alternatively, derived from the ester-forming equivalents thereof (e.g., any reactants which may be polymerized to ultimately provide a polymer of poly(trimethylene terephthalate). A most preferred molding resin comprises poly(trimethylene terephthalate) homopolymer.

A "poly(trimethylene terephthalate) copolymer" means any polymer comprising, or derived from, at least about 80 mole percent trimethylene terephthalate and the remainder of the polymer being derived from monomers other than terephthalic acid and 1,3-propanediol, or their ester forming equivalents. Examples of poly(trimethylene terephthalate) copolymers include copolyesters synthesized from 3 or more reactants, each having two ester forming groups. For example, a poly(trimethylene terephthalate) copolymer may be prepared by reacting 1,3-propanediol, terephthalic acid, and one or more comonomers selected from linear, cyclic, and branched aliphatic dicarboxylic acids having 4 to 12 carbon atoms such as butanedioic acid, pentanedioic acid, hexanedioic acid, azelaic acid, sebacic acid, dodecanedioic acid, 1,4-cyclohexanedicarboxylic acid, or ester-forming equivalents thereof; aromatic dicarboxylic acids other than terephthalic acid having 8 to 12 carbon atoms such as phthalic acid, isophthalic acid or 2,6-naphthalenedicarboxylic acid; linear, cyclic, and branched aliphatic diols other than 1,3-propanediol having 2 to 8 carbon atoms such as ethanediol, 1,2-propanediol, 1,4-butanediol, hexamethylene glycol, 3-methyl-1,5-pentanediol, 2,2-dimethyl-1,3-propanediol, 2-methyl-1,3-propanediol, cyclohexane dimethanol or 1,4-cyclohexanediol; and aliphatic and aromatic ether glycols having 4 to 10 carbon atoms such as hydroquinone bis(2-hydroxyethyl)ether. Alternatively, a poly(trimethylene terephthalate) copolymer may be prepared from a poly(ethylene ether) glycol having a molecular weight below about 460, such as diethylene ether glycol, methoxypolyalkylene glycol, diethylene glycol, and polyethylene glycol. The comonomer may be present in the copolymer at a level of about 0.5 to about 20 mol %, and may be present at a level of up to about 30 mol %.

Preferred PTT copolymers contain at least about 85 mol %, at least about 90 mol %, at least about 95 mol %, or at least about 98 mol %, of copolymerized units of trimethylene terephthalate. A suitable poly(trimethylene terephthalate) homopolymer for the invention is commercially available under the tradename Sorona® from E.I. du Pont de Nemours and Co., Wilmington, Del. Methods for preparation of PTT are discussed, for example in U.S. Pat. No. 6,277,947 and commonly owned U.S. patent application Ser. No. 11/638,919 [filed 14 Dec. 2006, entitled "Continuous Process for Producing Poly(trimethylene Terephthalate)"].

Another embodiment of the invention is a thermoplastic composition wherein said poly(trimethylene terephthalate) homopolymer or copolymer comprises poly(trimethylene terephthalate) repeat units and end groups, said poly(trimethylene terephthalate) homopolymer or copolymer having a cyclic dimer content of less than or equal to 1.1 wt %, as determined with nuclear magnetic resonance analysis, based on the weight of said poly(trimethylene terephthalate) repeat units and said cyclic dimer; and said poly(trimethylene terephthalate) homopolymer or copolymer having an intrinsic viscosity of about 0.9 to about 2.0 dL/g, preferably about 0.9 to about 1.5 dL/g, and about 0.9 to about 1.2 dL/g.

For the preferred PTT molding resin used herein, the cyclic dimer is of the following formula (I)

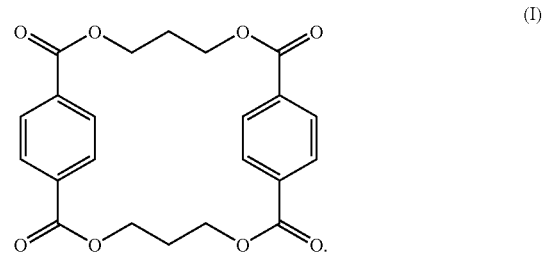 [SMILES: O=C1OCCCOC(=O)c2ccc(cc2)C(=O)OCCCOC(=O)c2ccc1cc2]

(I)

For determination of cyclic dimer content, NMR analysis is used herein. The analysis directly measures the content of all terephthalate groups in the polymer repeat units including the terephthalate present in any end groups, and in a separate and distinct region the terepthalate groups of the cyclic dimer. The peak attributed to the cyclic dimer is at about 7.7 ppm, distinct from the PTT terephthalate repeat units at 8.1 ppm.

A PTT resin having a cyclic dimer content of less than or equal to 1.1 wt %, is available by solid state polymerization of PTT comprising:

providing an initial PTT resin composition comprising poly(trimethylene terephthalate) repeat units, in the form of a plurality of pellets having a pellet size of 3.0-4.0 g/100 pellets, said initial PTT resin composition having an initial cyclic dimer content and one or more a condensation catalyst; said initial poly(trimethylene terephthalate) resin composition having an intrinsic viscosity of 0.50 to 0.89 dL/g; and heating and agitating the plurality of resin pellets to a condensation temperature for a condensation time to provide said high viscosity PTT resin having poly(trimethylene terephthalate) repeat units and having a low cyclic dimer content of less than or equal to 1.1 wt % as determined with nuclear magnetic resonance analysis and an intrinsic viscosity in the range of 0.9 to 2.0 dL/g; wherein the cyclic dimer content is based on the weight of said poly(trimethylene terephthalate) repeat units and said cyclic dimer.

The initial PTT resin has one or more a condensation catalyst, preferably about 25 to about 200 ppm based on the weight of said initial PTT resin composition. A preferred catalyst is titanium (IV) butoxide.

The heating and agitating the plurality of resin pellets to a condensation temperature can be done in a rotary dryer, fluidized bed, or fluidized column reactor in the range of 180° C. and 215° C., and under a reduced pressure of about 0.1 to about 10 mm Hg.

An alternative PTT solid state polymerization process is disclosed in U.S. Pat. No. 7,332,561.

The molding resin may, optionally, include 0 to 20 weight % of one or more organic additives selected from the group consisting of lubricants, flow modifiers, heat stabilizers, antioxidants, dyes, pigments, and UV stabilizers, and the like, provided that they don't negatively impact the physical properties or surface properties of the molded article.

The thermoplastic composition, optionally, may include 0 to 50 weight % of one or more fillers, based on the total weight of the thermoplastic composition. The filler is any material commonly used in thermoplastic compositions, such as reinforcing agents, and other fillers. The filler may or may not have a coating on it, for example, a sizing and/or a coating to improve adhesion of the filler to the polymers of the composition. The filler may be organic or inorganic. Useful fillers are those selected from the group consisting of minerals such as clay, sepiolite, talc, wollastonite, mica, and calcium carbonate; glass in various forms such as fibers, milled glass, solid or hollow glass spheres; carbon as black or fiber; titanium dioxide; aramid in the form of short fibers, fibrils or fibrids; flame retardants such as antimony oxide, sodium antimonate, and a combination of two or more thereof. In various embodiments the thermoplastic composition further comprises one or more fillers at about 0.1 to 50 wt %, about 1 to 50 wt %, about 5 to about 45 wt %; and about 10 to 40 wt %, based on the total weight of the thermoplastic composition. In various embodiments fillers are wollastonite, mica, talc, glass especially glass fiber, titanium dioxide, and calcium carbonate.

The term "acid copolymer" as used herein refers to a polymer comprising copolymerized units of an α-olefin, an α,β-ethylenically unsaturated carboxylic acid, and optionally other suitable comonomer(s) such as, an α,β-ethylenically unsaturated carboxylic acid ester.

The term "ionomer" as used herein refers to a polymer that comprises ionic groups that are alkali metal ion carboxylates, for example, sodium carboxylates. Such polymers are generally produced by partially or fully neutralizing the carboxylic acid groups of precursor acid copolymers, as defined herein, for example by reaction with a base. An example of an alkali metal ionomer is a sodium ionomer (or sodium neutralized ionomer), for example a copolymer of ethylene and methacrylic acid wherein all or a portion of the carboxylic acid groups of the copolymerized methacrylic acid units are in the form of sodium carboxylates.

The ionomer polymer comprises an ionomer that is an ionic, neutralized, or partially neutralized, derivative of a precursor acid copolymer. The precursor acid copolymer comprises copolymerized units of an α-olefin having 2 to 10 carbons and about 5 to about 30 wt %, about 5 to 25 wt %, or about 10 to about 25 wt %, of copolymerized units of an a,β-ethylenically unsaturated carboxylic acid having 3 to 8 carbons, based on the total weight of the precursor acid copolymer.

Suitable α-olefin comonomers include, but are not limited to, ethylene, propylene, 1-butene, 1-pentene, 1-hexene, 1-heptene, 3 methyl-1-butene, 4-methyl-1-pentene, and the like and mixtures of two or more of these α-olefins. Preferably, the α-olefin is ethylene.

Suitable α,β-ethylenically unsaturated carboxylic acid comonomers include, but are not limited to, acrylic acids, methacrylic acids, itaconic acids, maleic acids, maleic anhydrides, fumaric acids, monomethyl maleic acids, and mixtures of two or more of these acid comonomers. Preferably, the α,β-ethylenically unsaturated carboxylic acid is selected from acrylic acids, methacrylic acids, and mixtures of two or more acrylic acids or methacrylic acids.

The precursor acid copolymers may further comprise copolymerized units of other comonomer(s), such as unsaturated carboxylic acids having 2 to 10, or preferably 3 to 8 carbons, or derivatives thereof. Suitable acid derivatives include acid anhydrides, amides, and esters. Esters are preferred. Specific examples of preferred esters of unsaturated carboxylic acids include, but are not limited to, methyl acrylates, methyl methacrylates, ethyl acrylates, ethyl methacrylates, propyl acrylates, propyl methacrylates, isopropyl acrylates, isopropyl methacrylates, butyl acrylates, butyl methacrylates, isobutyl acrylates, isobutyl methacrylates, tert-butyl acrylates, tert-butyl methacrylates, octyl acrylates, octyl methacrylates, undecyl acrylates, undecyl methacrylates, octadecyl acrylates, octadecyl methacrylates, dodecyl acrylates, dodecyl methacrylates, 2-ethylhexyl acrylates, 2-ethylhexyl methacrylates, isobornyl acrylates, isobornyl methacrylates, lauryl acrylates, lauryl methacrylates, 2-hydroxyethyl acrylates, 2-hydroxyethyl methacrylates, glycidyl acrylates, glycidyl methacrylates, poly(ethylene glycol)acrylates, poly(ethylene glycol)methacrylates, poly(ethylene glycol) methyl ether acrylates, poly(ethylene glycol) methyl ether methacrylates, poly(ethylene glycol) behenyl ether acrylates, poly(ethylene glycol) behenyl ether methacrylates, poly(ethylene glycol) 4-nonylphenyl ether acrylates, poly (ethylene glycol) 4-nonylphenyl ether methacrylates, poly (ethylene glycol) phenyl ether acrylates, poly(ethylene glycol) phenyl ether methacrylates, dimethyl maleates, diethyl maleates, dibutyl maleates, dimethyl fumarates, diethyl fumarates, dibutyl fumarates, dimethyl fumarates, vinyl acetates, vinyl propionates, and mixtures of two or more thereof. Examples of preferable suitable comonomers include, but are not limited to, methyl acrylates, methyl methacrylates, butyl acrylates, butyl methacrylates, glycidyl methacrylates, vinyl acetates, and mixtures of two or more thereof. Preferably, however, the precursor acid copolymer does not incorporate other comonomers in any significant amount Mixtures of precursor acid copolymers are also suitable, provided that the properties of the copolymers are within the ranges described herein. For example, two or more dipolymers having differing amounts of copolymerized carboxylic acid comonomer or differing melt indices may be used. Also, a mixture of precursor acid copolymers including a dipolymer and a terpolymer may be suitable.

The precursor acid copolymer may have a melt flow rate (MFR) of about 10 to about 1000 g/10 min, or about 20 to about 500 g/10 min, or about 40 to about 300 g/10 min, or about 50 to about 250 g/10 min, as determined in accordance with ASTM method D1238 at 190° C. and 2.16 kg.

To obtain the ionomers useful in the ionomer compositions described herein, the precursor acid copolymers are neutralized with a base so that the carboxylic acid groups in the precursor acid copolymer react to form carboxylate groups. Preferably, the precursor acid copolymers groups are neutralized to a level of about 40% to about 90%, or about 40% to about 70%, or about 43% to about 60%, based on the total carboxylic acid content of the precursor acid copolymers as calculated or measured for the non-neutralized precursor acid copolymers.

Although any stable cation is believed to be suitable as a counterion to the carboxylate groups in an ionomer, for making the compositions of the invention monovalent cations, such as cations of alkali metals, are preferred. Still more preferably, the base is a sodium ion-containing base, to provide a sodium ionomer wherein about 40% to about 90%, or about 40% to about 70%, or about 43% to about 60% of the hydrogen atoms of the carboxylic acid groups of the precursor acid are replaced by sodium cations. The particular level of neutralization of the ionomer is referred to as the neutralization ratio.

One embodiment of the invention is wherein the one or more ionomer polymers comprise an ethylene/methacrylic acid copolymer having about 5 to 25 wt methacrylic acid repeat units based on the weight of the ethylene/methacrylic acid copolymer; and more particularly, the ethylene/methacrylic acid copolymer has a neutralization ratio of 0.40 to about 0.70.

To obtain the ionomers used herein, the precursor acid copolymers may be neutralized by any conventional procedure, such as those disclosed in U.S. Pat. Nos. 3,404,134 and 6,518,365.

The as-neutralized ionomer may have a MFR of about 0.1 to about 50 g/10 min or less, or about 0.2 to about 30 g/10 min or less, or about 0.3 to about 25 g/10 min, or about 0.5 to about 10 g/10 min, or about 0.6 to about 5 g/10 min, as determined in accordance with ASTM method D1238 at 190° C. and 2.16 kg.

Typically conventional PTT molding resins crystallize relatively slowly from the melt. To assess the ability of a particular resin composition to crystallize, the composition is typically melted under controlled isothermal conditions, and then the melt sample is cooled rapidly by immersing the melt sample in liquid nitrogen. This is known as "melt-quenching" or providing a "melt quenched sample." FIG. 1 shows a typical DSC scan of a melt quenched sample of a commercial PTT resin without added ionomer compositions. The scan was initiated at 0° C.; heated at 10° C./min scan rate through a recrystallization exotherm (100).

The recrystallization exotherm is a measure in Joules/g (J/g) sample of how much crystallization of the PTT composition has not occurred in the quenching process. Large exotherms indicate that the PTT composition crystallization is relatively slow and a large fraction of the PTT did not crystallize in the quench. Large exotherms are considered an undersired attribute in molding resins. Very small recrystallization exotherms, indicative of high degrees of crystallization during quench, are highly desirable for molding resins.

To increase the crystallization rate of the PTT molding resins, and thus reduce the cycle time of thermoplastic molding processes, nucleating agents usually are added in order to increase the rate of crystallization. Ionomers, which can often act as nucleating agents in polyesters, do not always give desirable results for PTT. For instance, Zn and Mg based ionomers of Comparative Examples C-7 and C-8 in Table 2, gave large recrystallization exotherms, indicating little crystallization occurred in the melt quench.

Another important attribute of the PTT molding resins that has to be considered for many applications, is the hydrolysis resistance of the molded parts derived from the thermoplastic compositions. Hydrolysis resistance is assessed herein by treating the molded parts of the thermoplastic composition in a Pressure Cooker Test at elevated temperature and pressure for a period of time up to 30 hours. The tensile strength and elongation to break are then determined for the treated samples and compared to those of untreated samples to determine the % retention of tensile strength and elongation to break.

Through diligent effort it has been found that a combination rapid crystallization and excellent hydrolysis resistance is provided by PTT molding resins having a very specific compositional range of (a-3) 0.1 to 4 weight % of one or more ionomer polymers or combination of one or more ionomer polymers and acid polymers. The compositional range is one defined by the following formula (I):

$$ACF = \Sigma_{a-i}[(W \cdot Z \cdot N)_{a-i}(W \cdot N)_{a-i} 100 / \Sigma_{a-i}(W)_{a-i}] \quad (I)$$

wherein each ionomer and acid copolymer has:
a weight %, W;
a weight fraction of $C_3$ to $C_8$ carboxylic acid repeat units, Z, based on the weight of each ionomer or acid copolymer; and
a neutralization ratio, N, equal to any value from 0 to 1.0;
wherein said neutralization ratio N is the mol fraction of the carboxylic acid repeat units neutralized as an alkali metal salt, based on the total carboxylic acid repeat units in said ionomer and acid copolymers; and
said each ionomer and acid polymer wt % W is based on the weight of components (a-1) poly(trimethylene terephthalate) homopolymer or copolymer, (a-2) one or more organic additives, and (a-3) one or more ionomer polymers or combination of one or more ionomer polymers and acid copolymers, as disclosed above; wherein said molding resin has an alkali carboxylate factor, ACE, of 4 to about 14, and preferably 4 to 12.

The term $(W \cdot Z \cdot N)_{a-i}$ is referred to a the alkali carboxylate level; and the term $(W \cdot N)_{a-i} / \Sigma_{a-i}(W)_{a-i}$ is the weight averaged neutralization ratio for the composition; wherein each ionomer polymer and acid copolymer present in a composition is represented by a consecutive letter a-i. The sum contribution of all the individual ionomer polymers and acid copolymers gives the ACF number. However, the acid copolymers, by definition, have a neutralization ratio of 0, and thus only contribute to the $\Sigma_{a-i}(W)_{a-i}$ term in formula (I). Thus, it is clear that the ACF can be influenced by the presence and amount of acid copolymer in the molding resin.

Figure 2:
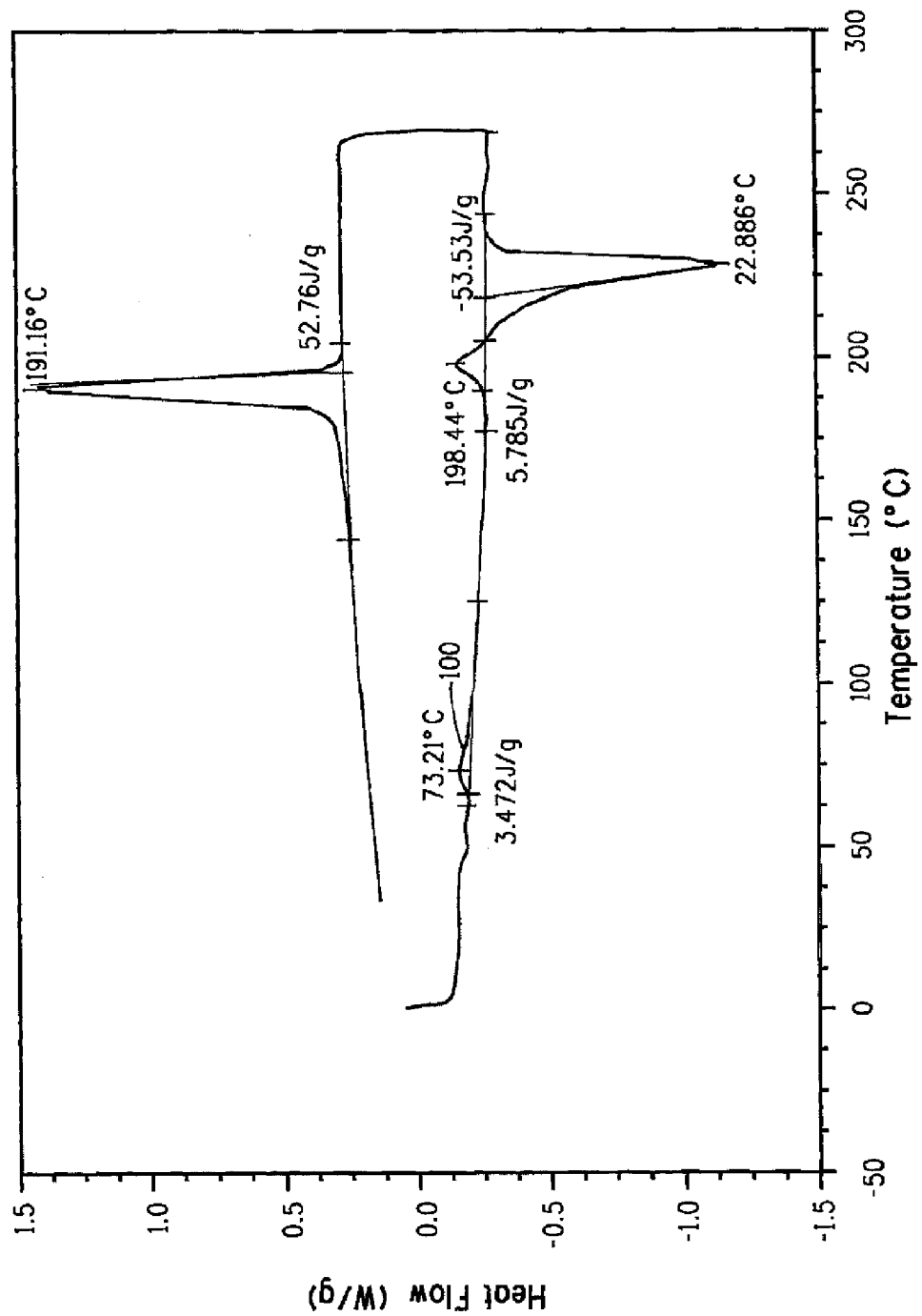
FIG. 2 shows a thermoplastic composition of the invention wherein the composition has an ACF of 5.22 and the recrystallization exotherm (100) is less than 5 J/g.
Figure 3:
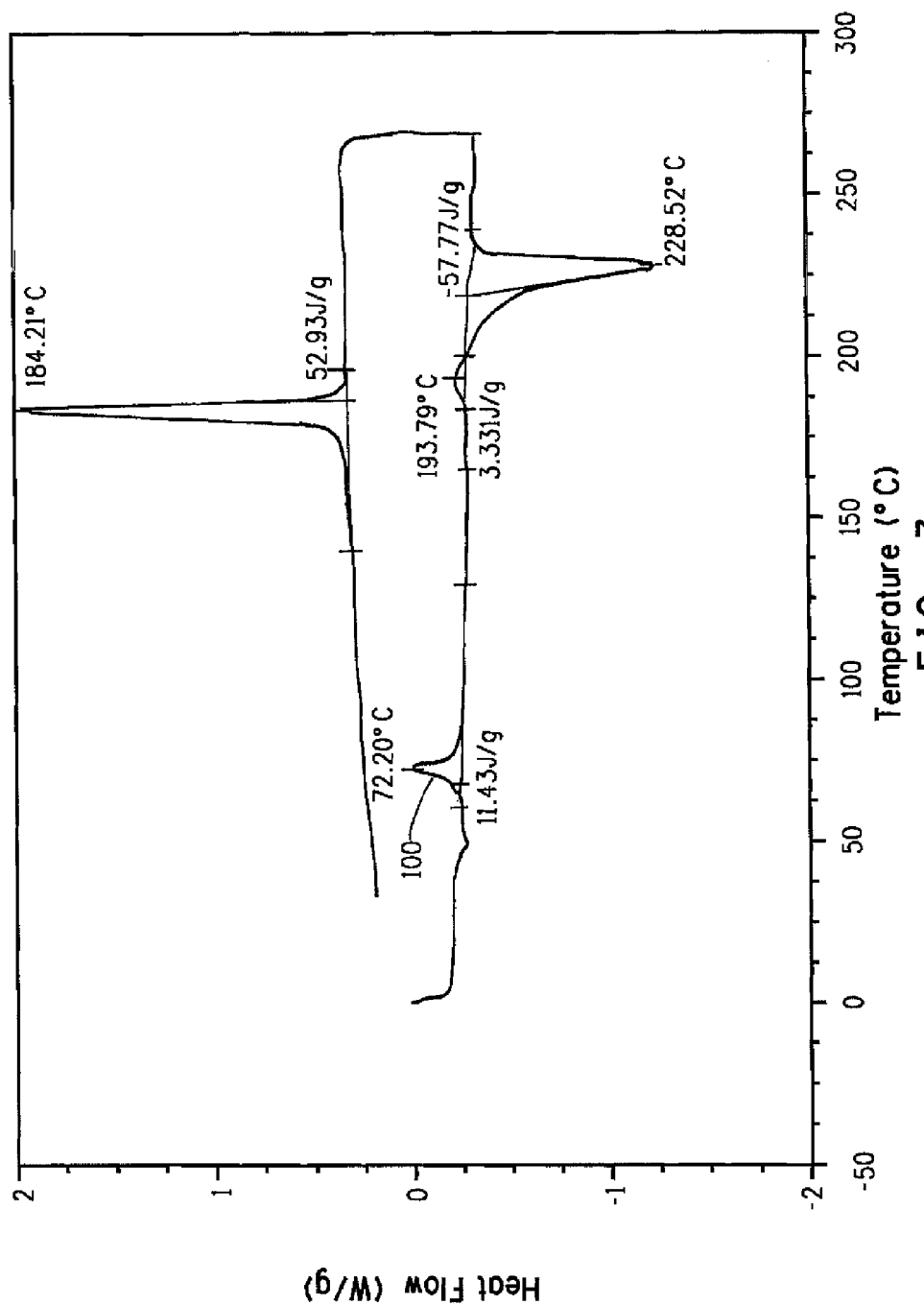
FIG. 3 shows a comparative example wherein the thermoplastic composition has an ACF of 2.6 and the recrystallization exotherm (100) is about 11.4 J/g.

To illustrate the bounds of the invention, FIG. 2 shows a thermoplastic composition of the invention wherein the composition has an ACF of 5.22 and the recrystallization exotherm (100) is less than 5 J/g and is a preferred thermoplastic composition of the invention. FIG. 3 shows a comparative example wherein the thermoplastic composition has an ACF of 2.6 and the recrystallization exotherm (100) is about 11.4 J/g; a less desirable value than that of the composition of FIG. 2.

In one embodiment of the invention the thermoplastic composition exhibits a recrystallization peak of less than 5 J/g as measured with Differential Scanning Calorimetry (DSC) at 10° C./min scan rate from a melt quenched sample.

In one embodiment of the invention the thermoplastic composition exhibits greater than about 70% tensile strength retention after a Pressure Cooker Test for 30 h at 121° C. and 2 atm, relative to an untreated molded article, as measured with ISO method 527-1/2.

The compositions of the present invention are in the form of a melt-mixed blend, wherein all of the polymeric components are well-dispersed within each other and all of the non-polymeric ingredients are homogeneously dispersed in and bound by the polymer matrix, such that the blend forms a unified whole. The blend may be obtained by combining the component materials using any melt-mixing method. The component materials may be mixed to homogeneity using a melt-mixer such as a single or twin-screw extruder, blender, kneader, Banbury mixer, etc. to give a resin composition. Or, part of the materials may be mixed in a melt-mixer, and the rest of the materials may then be added and further melt-mixed until homogeneous. The sequence of mixing in the manufacture of the flame resistant polyester resin composition of this invention may be such that individual components may be melted in one shot, or the filler and/or other components may be fed from a side feeder, and the like, as will be understood by those skilled in the art.

The composition of the present invention may be formed into articles using methods known to those skilled in the art, such as, for example, injection molding. Such articles can include those for use in electrical and electronic applications, mechanical machine parts, and automotive applications. Various embodiments of the invention are molded articles provided by the injection molding of the poly(trimethylene terephthalate) resin composition.

Materials

PTT-B. PTT resin (4682 Kg of pellets, E. I. du Pont de Nemours & Co., Inc. Wilmington, Del., USA) provided from continuous polymerization of 1,3-propanediol with dimethyl terephthalate in the presence of titanium (IV) n-butoxide (100 ppm) having 33±2 mg per pellet with dimensions 2.9±0.2× 2.8±0.2×4.1±0.2 mm, with an inherent viscosity of 0.76 dL/g, and with a PTT cyclic dimer concentration of 2.5 weight %, was charged to a dual cone tumble drier (ABBE rotating dryer, model 24, Patterson, N.J., USA) The tumble drier was rotated at a rate of 4 revolutions per minute while heating at a rate of 10° C./h up to 205° C. under vacuum 0.52 mm Hg (69 Pa). The temperature of the drier was held at 205±24° C. for 11 hours. The dryer was cooled under vacuum until pellet temperature reached 60° C.; the vacuum was broken with nitrogen and the reactor was packed out under positive nitrogen pressure. The dryer was cooled at a rate of 25° C./h to provide the solid phase polymerization pellets having a cyclic dimer concentration of 0.82 weight % as determined with NMR and the intrinsic viscosity (IV) of 1.14 dL/g.

Acid polymer-A resin is an ethylene-methacrylic acid copolymer (15 wt % MMA, Z=0.15, 0 mol % Na neutralized)

Ionomer-A resin is a neutralized ethylene-methacrylic acid copolymer (19 wt % MAA, Z=0.19, 55 mol % Na neutralized).

Ionomer-B resin is a neutralized ethylene-methacrylic acid copolymer (15 wt % MAA, Z=0.15, 59 mol % Na neutralized)

Ionomer-C resin is a neutralized ethylene-methacrylic acid copolymer (11 wt % MAA, Z=0.11, 55 mol % Na neutralized).

Ionomer-D resin is a neutralized ethylene-methacrylic acid copolymer (15 wt % MAA, Z=0.15, 60 mol % Zn neutralized).

Ionomer-E resin is a neutralized ethylene-methacrylic acid copolymer (15 wt % MAA, Z=0.15, 60 mol % Mg neutralized).

Ionomer-F resin is a neutralized ethylene-methacrylic acid copolymer (15 wt % MAA, Z=0.15, 70 mol % Na neutralized)

Ionomer-G resin is a neutralized ethylene-methacrylic acid copolymer (15 wt % MAA, Z=0.15, 90 mol % Na neutralized)

Ionomers A-E and Acid polymer-A resin are available from E.I. du Pont de Nemours and Co., Wilmington, Del., under the Surlyn® resin brand and Nucrel® resin brand, respectively. Ionomer-F and G were prepared by synthesis form Ionomer-B.

Irganox® 1010 antioxidant is available from Ciba Specialty Chemicals, Inc., Tarrytown, N.Y.

C-Black refers to RYNRE5334 BKC, a concentrate pellet of 52.5 weight % polyethylene carrier and 47.5 weight % carbon black manufactured by Clariant Corp., Charlotte, N.C.

Wax OP, is a lubricant manufactured by Clariant Corp., Charlotte, N.C.

Plasthall® 809 is polyethylene glycol 400 di-2-ethylhexoate available from C.P. Hall Company, Chicago, Ill. 60606.

Methods

Sample Preparation and Physical Testing

The compositions of the Examples and Comparative Examples were molded into 4 mm ISO all-purpose bars. The test pieces were used to measure mechanical properties on samples at 23° C. and dry as molded. The following test procedures were used and the results are given in Table 1-3:

Tensile strength and elongation at break: ISO 527-1/2

Pressure Cooker Test

Test bars were also conditioned in an autoclave at 121° C., 2 atm, and 100% relative humidity for 30 hours. Mechanical properties were measured on the conditioned test bars and the results were compared to the properties of the unconditioned bars. The mechanical properties of the conditioned bars and the percentage retention of the physical properties are given in Tables 1-3. A greater retention of physical properties indicates better hydrolysis resistance.

Intrinsic Viscosity

The intrinsic viscosity (IV) of the PTT resin was determined using viscosity measured with a Viscotek Forced Flow Viscometer Y-501 (Viscotek Corporation, Houston, Tex.) for the polymers dissolved in 50/50 weight % trifluoroacetic acid/methylene chloride at a 0.4 grams/dL concentration at 19° C. following an automated method based on ASTM D 5225-92. The measured viscosity was then correlated with standard viscosities in 60/40 wt phenol/1,1,2,2-tetrachloroethane as determined by ASTM D 4603-96 to arrive at the reported intrinsic values.

Determination of Cyclic Dimer Content by NMR 4-6 pellets of PTT were melt pressed at 260° C. and melted for 5 minutes and subsequently pressed to 10,000 lbs of pressure to create a thin film (0.14 mm thick) to increase the surface area of the polymer for easy dissolution. The pressed film of polymer (15 mg) was added to $CDCl_3$/TFA-d (5:1, 1 mL) mixture and dissolved. The solution was transferred to a 5 mm NMR tube and analyzed within one hour of sample preparation. 64 scans were run at 30° C. with a 16 second delay time on a Varian INOVA 500 MHz NMR with a proton/fluorine/carbon probe. The obtained spectrum was integrated at the terephthalate region (8.1 ppm) and the cyclic dimer region (7.65 ppm). The weight percent of cyclic dimer is calculated by dividing the integration value of the cyclic dimer region by the sum of the integration values of the cyclic dimer region and the terephthalate region multiplied by 100.

Differential Scanning Calorimetry (DSC)

A Differential scanning calorimeter, TA Instruments Q1000 MDSC (Modulated DSC) operating in "Standard Mode" was used to determine the recrystallization peak in a melt quenched sample of the thermoplastic composition. A 10-12 mg sample of the composition was weighed into an aluminum DSC pan and the sample heated to 270° C. in a DSC for 10 minutes under nitrogen atmosphere to provide an equilibrated melt sample. The melt sample was remove from the DSC and quick quenched by immersing the sample in liquid nitrogen. The melt quenched sample was equilibrated at 0° C. in the DSC under nitrogen atmosphere, followed by heating at 10° C./min scan rate to 270° C.; held at isothermal for 3 min at 270° C., and cooled at 10° C./min scan rate to 30° C.; while recording the thermal events. The recrystallization peak is the first exothermic peak exhibited in the heating cycle, having a peak height maximum at about 65-75° C. The enthalpy of the recrystallization peak was measured in Joules per gram (J/g).

EXAMPLES AND COMPARATIVE EXAMPLES

Components listed in Tables 1-3, for Examples and Comparative Examples, with the exception of Plasthall® 809, were combined and fed to the rear of a ZSK 40 mm twin screw extruder and melt mixed using at a melt temperature of about 260° C. to yield a resin composition. Plasthall® 809 was added into the die position of the extruder using liquid injection pump line. Exiting the extruder, the composition was passed through a die to form strands that were cooled and solidified in a quench tank and subsequently chopped to form pellets.

The compositions were molded into test specimens and tested according to the methods outlined above.

Comparative Example C-1 is a PTT molding resin composition containing no ionomer polymer and having a very large recrystallization exotherm peak (39.9 J/g).

Examples 1-11 have an ACF of between 4 and 12 and have recrystallization exotherms all less than 5 J/g, and Tensile strength retention of greater than about 66% in the Pressure Cooker Test. Comparative Example C-2, C-3, C-4 and C-5 show an ACF below 4; and recrystallization exotherms greater than 5, and in case of C-3, greater than about 20 J/g. Thus, ACF below 4 tends to lead to higher recrystallization exotherms which are not desirable.

Comparative Example C-6, C-9 and C-10, have ACF higher than 14 ((26, 14.7 and 18.2 respectively) and all show tensile strength retention of 43% or less in the Pressure Cooker Test.

Comparative Examples C-7 and C-8 show that ionomers having zinc or magnesium as the neutralization counter ions do not provide the desirable reductions in recrystallization exotherms.

TABLE 1

| | Example No. | | | | | | | | | |
|---|---|---|---|---|---|---|---|---|---|---|
| | C-1 | 1 | 2 | 3 | C-2 | 4 | 5 | C-3 | 6 | 7 |
| PTT-B | 98.50 | 97.50 | 97.00 | 96.50 | 97.50 | 96.50 | 95.50 | 95.50 | 96.00 | 95.10 |
| Wax OP | 0.20 | 0.20 | 0.20 | 0.20 | 0.20 | 0.20 | 0.20 | 0.20 | 0.20 | 0.20 |
| Acid polymer-A | | | | | | | | | 1.50 | |
| Ionomer-A | | | | | 1.00 | 2.00 | 3.00 | | | |
| Ionomer-B | | 1.00 | 1.50 | 2.00 | | | | 1.50 | 1.50 | 1.50 |
| Irganox ® 1010 | 0.30 | 0.30 | 0.30 | 0.30 | 0.30 | 0.30 | 0.30 | 0.30 | 0.30 | 0.20 |
| C-Black | 1.00 | 1.00 | 1.00 | 1.00 | 1.00 | 1.00 | 1.00 | 1.00 | 1.00 | 1.00 |
| Plasthall 809 | | | | | | | | | 1.00 | 2.00 |
| Total Production (%) | 100.00 | 100.00 | 100.00 | 100.00 | 100.00 | 100.00 | 100.00 | 100.00 | 100.00 | 100.00 |
| Properties | | | | | | | | | | |
| Tensile Strength (Mpa) Control | 64.792 | 65.938 | 66.286 | 66.328 | 65.781 | 65.075 | 64.502 | 62.650 | 62.028 | 59.203 |
| Elongation at Break (%) Control | 15.91% | 20.93% | 19.91% | 19.70% | 20.48% | 20.24% | 21.14% | 18.66% | 18.50% | 20.59% |
| Tensile Strength (Mpa) 30 h PCT | 62.181 | 59.061 | 52.768 | 52.494 | 55.626 | 48.523 | 44.992 | 50.962 | 47.521 | 46.981 |
| Elongation at Break (%) 30 h PCT | 12.96% | 9.07% | 3.81% | 3.27% | 5.93% | 2.64% | 2.16% | 3.98% | 3.69% | 4.99% |
| Recrystallization peak (J/g) | 38.90 | 3.90 | 3.27 | 3.46 | 5.71 | 4.77 | 3.72 | 20.3 | 4.22 | 2.21 |
| Sum of alkali carboxylate level | 0.0000 | 0.0885 | 0.1328 | 0.1770 | 0.0855 | 0.1710 | 0.2565 | 0.1328 | 0.1328 | 0.1328 |
| Weight Averaged Neutralization Ratio × 100 | 0.0000 | 59.0000 | 59.0000 | 59.0000 | 45.0000 | 45.0000 | 45.0000 | 29.5000 | 59.0000 | 59.0000 |
| ACF | 0.0000 | 5.2215 | 7.8323 | 10.4430 | 3.8475 | 7.6950 | 11.5425 | 3.9161 | 7.8323 | 7.8323 |
| 30 h PCT TS retention (%) | 95.97 | 89.57 | 79.61 | 79.14 | 84.56 | 74.56 | 69.75 | 81.34 | 76.61 | 79.40 |
| 30 h PCT El retention (%) | 81.46% | 43.33% | 19.14% | 16.60% | 28.96% | 13.04% | 10.22% | 21.33% | 19.95% | 24.24% |

ACF = alkali carboxylate factor calculated from formula 1.

TABLE 2

| | Example No. | | | | | | | | |
|---|---|---|---|---|---|---|---|---|---|
| | 8 | 9 | 10 | C-4 | 11 | C-5 | C-6 | C-7 | C-8 |
| PTT-B | 97.14 | 96.45 | 97.50 | 96.50 | 97.00 | 95.50 | 89.50 | 97.0 | 97.0 |
| Wax OP | 0.20 | 0.20 | 0.20 | 0.20 | 0.20 | 0.20 | 0.20 | 0.2 | 0.2 |
| Acid Polymer-A | | | | 1.00 | | 1.50 | | | |
| Ionomer-C | 1.36 | 2.05 | | | | | | | |
| Ionomer-B | | | 1.00 | 1.00 | 1.50 | 1.50 | 5.00 | | |
| Ionomer-D | | | | | | | | 1.5 | |
| Ionomer-E | | | | | | | | | 1.5 |
| Irganox ® 1010 | 0.30 | 0.30 | 0.30 | 0.30 | 0.30 | 0.30 | 0.30 | 0.3 | 0.3 |
| C-Black | 1.00 | 1.00 | 1.00 | 1.00 | 1.00 | 1.00 | 1.00 | 1.0 | 1.0 |
| Plasthall 809 | | | | | | | 4.00 | | |
| Total Production (%) | 100.00 | 100.00 | 100.00 | 100.00 | 100.00 | 100.00 | 100.00 | 100 | 100 |
| Properties | | | | | | | | | |
| Tensile Strength (Mpa) Control | 60.433 | 56.350 | 66.336 | 64.248 | 65.545 | 62.940 | 51.846 | 62.5 | 61.4 |
| Elongation at Break (%) Control | 18.30 | 15.90 | 18.80 | 18.60 | 19.10 | 19.00 | 23.30 | 19 | 18.4 |
| Tensile Strength (Mpa) 30 h PCT | 44.80 | 37.00 | 55.60 | 56.20 | 50.10 | 50.30 | 22.40 | 43.5 | 48.2 |
| Elongation at Break (%) 30 h PCT | 3.4 | 2.6 | 3.8 | 5.3 | 2.6 | 3.4 | 1.4 | 3.2 | 3.6 |
| 30 h PCT TS retention (%) | 74 | 66 | 84 | 87 | 76 | 80 | 43 | 70 | 79 |
| 30 h PCT El retention (%) | 19 | 16 | 20 | 28 | 14 | 18 | 6 | 17 | 20 |
| Recrystallization peak (J/g) | 2.90 | 0.00 | 3.50 | 11.40 | 3.30 | 10.90 | 0.00 | 40.8 | 39.8 |
| Sum of alkali carboxylate level | 0.0868 | 0.1308 | 0.0885 | 0.0885 | 0.1328 | 0.1328 | 0.4425 | | |
| Weight Averaged Neutralization Ratio × 100 | 55.0000 | 55.0000 | 59.0000 | 29.5000 | 59.0000 | 29.5000 | 59.0000 | | |
| ACF | 4.7722 | 7.1935 | 5.2215 | 2.6108 | 7.8323 | 3.9161 | 26.1075 | | |

ACF = alkali carboxylate factor calculated from formula 1.

TABLE 3

| Example No. | C-9 | C-10 |
|---|---|---|
| PTT-B | 96.5 | 97.0 |
| Wax OP | 0.2 | 0.2 |
| Ionomer-F | 2 | |
| Ionomer-G | | 1.5 |
| Irganox ® 1010 | 0.3 | 0.3 |
| C-Black | 1.0 | 1.0 |
| Total Production (%) | 100 | 10 |
| Properties | | |
| Tensile Strength (Mpa) Control | 67 | 68 |
| Elongation at Break (%) Control | 21 | 21 |
| Tensile Strength (Mpa) 30 h PCT | 26.9 | 25.7 |
| Elongation at Break (%) 30 h PCT | 1 | 1 |
| 30 h PCT TS retention (%) | 40 | 38 |
| 30 h PCT El retention (%) | 5 | 5 |
| Recrystallization peak (J/g) | 5.48 | 4.83 |
| Sum of alkali carboxylate level | 0.21 | 0.20 |
| Weight Averaged Neutalization Ratio × 100 | 70 | 90 |
| ACF | 14.7 | 18.2 |

ACF = alkali carboxylate factor calculated from formula 1.

The invention claimed is:

1. A thermoplastic composition comprising
a) a molding resin comprising
 (a-1) a poly(trimethylene terephthalate) homopolymer or copolymer;
 (a-2) optionally, 0.1 to 20 weight % of one or more organic additives selected from the group consisting of lubricants, flow modifiers, plasticizers, heat stabilizers, antioxidants, dyes, pigments, and UV stabilizers;
 (a-3) 0.1 to 4 weight % of one or more ionomer polymers or a combination of one or more ionomer polymers and acid copolymers; said ionomer polymers and acid copolymers having $C_3$ to $C_8$ carboxylic acid repeat units, and each ionomer and acid copolymer having:
 a weight %, W;
 a weight fraction of $C_3$ to $C_8$ carboxylic acid repeat units, Z, based on the weight of each ionomer or acid copolymer; and
 a neutralization ratio, N, equal to any value from 0 to 1.0;
 wherein said neutralization ratio N is the mol fraction of said carboxylic acid repeat units neutralized as an alkali metal salt, based on the total carboxylic acid repeat units in said ionomer and acid copolymers; and
 said each ionomer and acid polymer wt % W is based on the weight of components (a-1), (a-2) and (a-3);
 and said molding resin has an alkali carboxylate factor, ACF, of 4 to about 14;
wherein said ACF is defined by the formula:

$$ACF = \Sigma_{a\text{-}i}[(W \cdot Z \cdot N)_{a\text{-}i}(W \cdot N)_{a\text{-}i} \cdot 100/\Sigma_{a\text{-}i}(W)_{a\text{-}i}]$$

and,
b) 0 to 50 wt % of one or more fillers, based on the total weight of the thermoplastic composition;
wherein the poly(trimethylene terephthalate) homopolymer or copolymer comprises poly(trimethylene terephthalate) repeat units and end groups and has a cyclic dimer content of less than or equal to 1.1 wt %, as determined with nuclear magnetic resonance analysis, based on the weight of said poly(trimethylene terephthalate) repeat units and said cyclic dimer and an intrinsic viscosity of 0.9 to about 2.0 dL/g.

2. The thermoplastic composition of claim 1 wherein an article comprising said composition exhibits greater than about 70% tensile strength retention after a Pressure Cooker Test for 30 h at 121° C. and 2 atm, relative to an untreated molded article, as measured with ISO method 527-1/2(1993).

3. The thermoplastic composition of claim 1, wherein said composition exhibits a recrystallization exotherm of less than 5 J/g as measured with Differential Scanning calorimetry at 10° C./min scan rate from a melt quenched sample.

4. A thermoplastic composition, comprising
a) a molding resin comprising
 (a-1) a poly(trimethylene terephthalate) homopolymer or copolymer;
 (a-2) optionally, 0.1 to 20 weight % of one or more organic additives selected from the group consisting of lubricants, flow modifiers, plasticizers, heat stabilizers, antioxidants, dyes, pigments, and UV stabilizers;
 (a-3) 0.1 to 4 weight % of one or more ionomer polymers or a combination of one or more ionomer polymers and acid copolymers; said ionomer polymers and acid copolymers having $C_3$ to $C_8$ carboxylic acid repeat units, and each ionomer and acid copolymer having:
 a weight %, W;
 a weight fraction of $C_3$ to $C_8$ carboxylic acid repeat units, Z, based on the weight of each ionomer or acid copolymer; and
 a neutralization ratio, N, equal to any value from 0 to 1.0;
 wherein said neutralization ratio N is the mol fraction of said carboxylic acid repeat units neutralized as an alkali metal salt, based on the total carboxylic acid repeat units in said ionomer and acid copolymers; and
 said each ionomer and acid polymer wt % W is based on the weight of components (a-1), (a-2) and (a-3);
 and said molding resin has an alkali carboxylate factor, ACF, of 4 to about 14;
wherein said ACF is defined by the formula:

$$ACF = \Sigma_{a\text{-}i}[(W \cdot Z \cdot N)_{a\text{-}i}(W \cdot N)_{a\text{-}i} \cdot 100/\Sigma_{a\text{-}i}(W)_{a\text{-}i}]$$

and,
b) 0 to 50 wt % of one or more fillers, based on the total weight of the thermoplastic composition,
wherein the one or more ionomer polymers comprise an ethylene/methacrylic acid copolymer having about 5 to 25 wt % methacrylic acid repeat units based on the weight of ethylene/methacrylic acid copolymer.

5. The thermoplastic composition of claim 1, wherein said one or more fillers is present in the range of about 0.1 to 50 weight percent, based on the total weight of the thermoplastic composition, and is selected from the group consisting of minerals; glass; carbon as black or fiber; titanium dioxide; aramid in the form of short fibers, fibrils or fibrids; flame retardants, and a combination of two or more thereof.

6. A molded article comprising the thermoplastic composition of claim 1.

7. The thermoplastic composition of claim 4, wherein the neutralization ratio is 0.40 to about 0.70.

8. The thermoplastic composition of claim 5, wherein the mineral is selected from the group consisting of clay, sepiolite, talc, wollastonite, mica, calcium carbonate, and mixtures of these.

9. The thermoplastic composition of claim 5, wherein the glass is selected from the group consisting of fibers, milled glass, solid or hollow glass spheres, and mixtures of these.

10. The thermoplastic composition of claim 5, wherein the flame retardant is selected from the group consisting of antimony oxide, sodium antimonite, and mixtures thereof.

11. The thermoplastic composition of claim 7, wherein said one or more fillers is present in the range of about 0.1 to 50 weight percent, based on the total weight of the thermoplastic composition, and is selected from the group consisting of minerals; glass; carbon as black or fiber; titanium dioxide; aramid in the form of short fibers, fibrils or fibrids; flame retardants, and a combination of two or more thereof.

12. The thermoplastic composition of claim 11, wherein the mineral is selected from the group consisting of clay, sepiolite, talc, wollastonite, mica, calcium carbonate, and mixtures of these.

13. The thermoplastic composition of claim 11, wherein the glass is selected from the group consisting of fibers, milled glass, solid or hollow glass spheres, and mixtures of these.

14. The thermoplastic composition of claim 11, wherein the flame retardant is selected from the group consisting of antimony oxide, sodium antimonite, and mixtures of these.

\* \* \* \* \*